United States Patent [19]

Dezenberg et al.

[11] Patent Number: 4,507,786
[45] Date of Patent: Mar. 26, 1985

[54] PUSH-PULL PULSED GAS LASER

[75] Inventors: George J. Dezenberg; Charles E. Cooper, Jr., both of Huntsville, Ala.

[73] Assignee: The United States of America as represented by the Secretary of the Army, Washington, D.C.

[21] Appl. No.: 525,374

[22] Filed: Aug. 22, 1983

[51] Int. Cl.³ .............................................. H01S 3/00
[52] U.S. Cl. ........................................ 372/33; 372/29; 372/34; 372/61; 372/92; 372/705; 372/59
[58] Field of Search ...................... 372/33, 29, 55, 61, 372/89, 90, 34, 92

[56] References Cited

PUBLICATIONS

Srivastava et al., "Acoustic Suppression in a Pulsed Laser System", AIAA Journal, vol. 18, No. 5, May 1980.
Culick et al., "Acoustic Waves and Heating Due to Molecular Energy Transfer in an Electric Discharge CO Laser", IEEE JQE, vol. 12, No. 10, Oct. 1976, pp. 566–574.
Kulkarny, "Decay of Transverse Acoustic Waves in a Pulsed Gas Laser", AIAA Journal, vol. 18, No. 11, Nov. 1980, pp. 1336–1341.

Primary Examiner—William L. Sikes
Assistant Examiner—Léon Scott, Jr.
Attorney, Agent, or Firm—Anthony T. Lane; Robert P. Gibson; James T. Deaton

[57] ABSTRACT

A push-pull pulsed gas laser which utilizes piston action to displace a laser gas from the laser cavity to a heat exchanger and return of the gas to the laser cavity between laser pulses to significantly reduce the volume of gas required for repetatively pulsed gas lasers and to reduce the average power required to recondition the laser gas.

4 Claims, 3 Drawing Figures

PUSH-PULL PULSED GAS LASER

DEDICATORY CLAUSE

The invention described herein may be manufactured, used, and licensed by or for the Government for governmental purposes without the payment to us of any royalties thereon.

BACKGROUND OF THE INVENTION

The closed cycle repetitively pulsed gas lasers which have been built to date utilize a closed cycle gas recirculating system as shown in FIG. 1 of the drawings. In these systems, the laser gas is continuously circulated by fans or compressors in a closed system. The heat added to the laser gas due to electrical or optical excitation and due to compression is removed by heat exchangers. Sometimes, a temperature trimmer is used just upstream of the laser cavity to reduce the spatial temperature variation of the laser gas and insure good media quality in the cavity or equivalently to insure good laser beam quality. Acoustic suppressors are used either in the side walls or in the laser gas circulator to damp out the gas density perturbations generated by the excitation process of depositing energy into the relatively small volume of gas in the laser cavity. Additionally, flow straightening screens or porous honeycomb materials are sometimes used upstream of the laser cavity to improve media uniformity. With these devices, a relatively large quanity of laser gas is required and is continuously circulated throughout the system. Therefore, the system is relatively heavy as well as requiring a substantial amount of average power to run the circulating system for reconditioning the laser gas after each laser pulse that is produced. Therefore, it can be seen that a more compact and power efficient closed cycle system is needed to enhance fieldability of a laser of this type as well as to reduce the average power required for conditioning the laser gas.

Accordingly, it is an object of this invention to provide a closed system in which the laser gas can be reconditioned after each pulse utilizing a relatively small space and a smaller amount of power required to recondition the laser gas.

Another object of this invention is to provide a push-pull pulsed laser gas configuration in which fieldability of the device is enhanced.

Other objects and advantages of this invention will be obvious to those skilled in this art.

SUMMARY OF THE INVENTION

In accordance with this invention, a closed system push-pull device for a pulsed gas laser is provided in which the laser cavity of the device is filled with laser gas and after the laser has been pulsed, the laser gas is moved from the laser cavity to appropriate heat exchanger and acoustics suppressor means by the push-pull mechanisms to recondition the laser gas and place it back in the laser cavity for a second pulse to be produced.

DESCRIPTION OF THE PREFERRED EMBODIMENT

Figure 1:
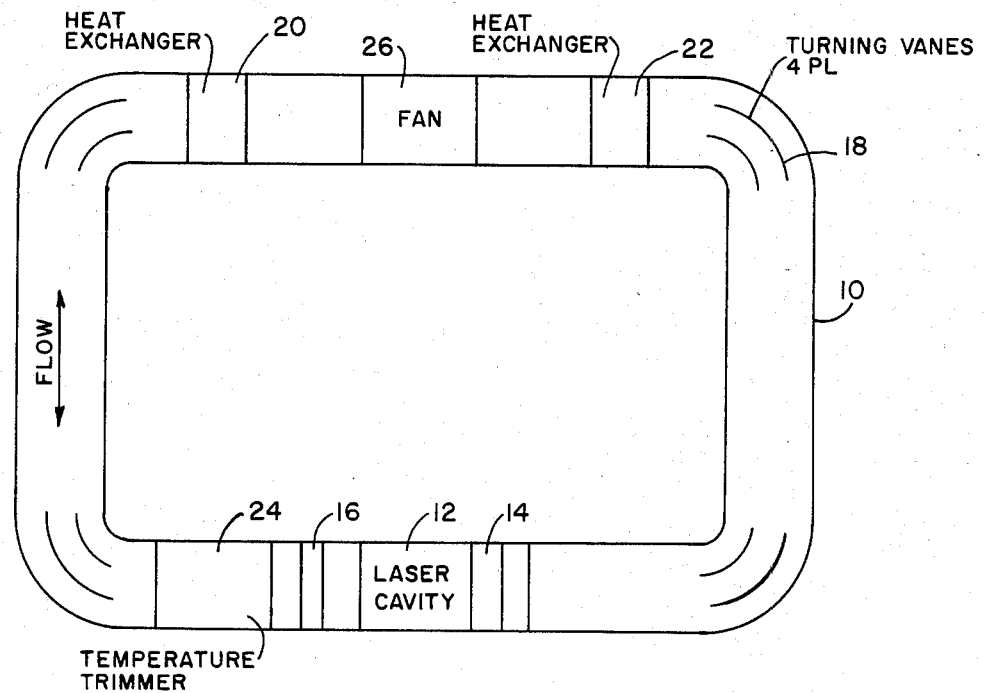
FIG. 1 is a schematic view of a conventional pulse gas laser closed system configuration.

Referring now to the drawing, in FIG. 1 a closed loop type system is illustrated and includes a closed circulating housing 10 that has a laser cavity 12 therein with acoustic suppressors 14 and 16 mounted on opposite sides of the laser cavity and with the system having positioned therein turning vanes 18 at each of the bends in the system with heat exchangers 20 and 22 positioned therein as well as a temperature trimmer 24. A fan or pump means 26 is used to circulate laser gas within housing 10 to provide a cooled laser gas in laser cavity 12 to provide cooled gas for each pulse of the laser. In this system, it can be seen that the volume of gas needed to fill housing 10 is considerably more than that needed for the laser cavity and is therefore quite bulky. Further, the heat exchangers, temperature trimmer and other elements of the system that are utilized to provide the closed system are relatively bulky. Therefore, the fieldability of this system is generally not practical.

Figure 2:
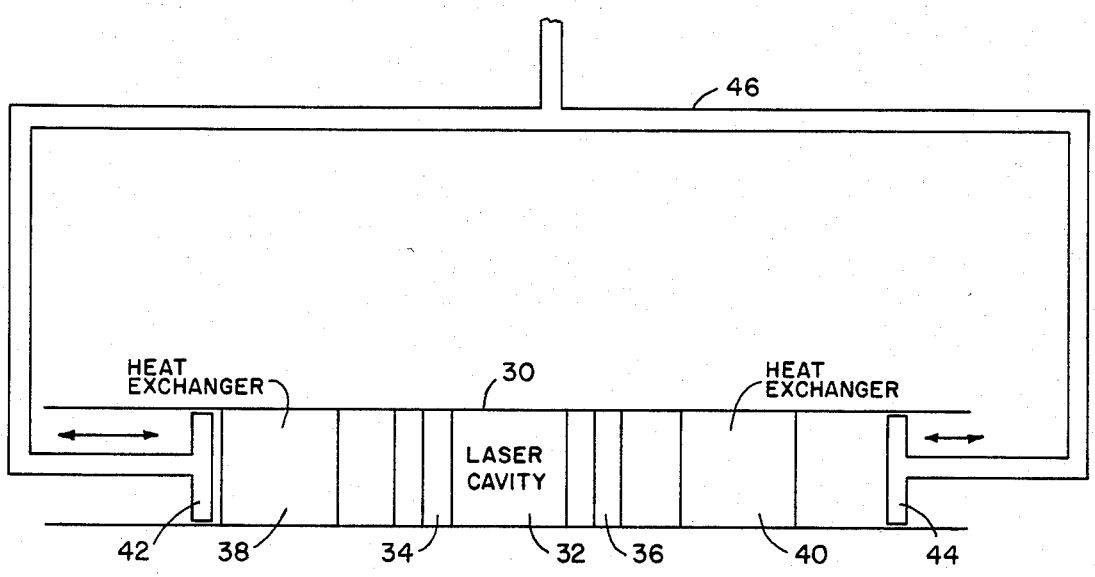
FIG. 2 is a schematic illustration of a push-pull gas laser configuration in accordance with this invention.

Referring now to FIG. 2, a push-pull pulse gas laser arrangement according to this invention is illustrated which includes a housing 30 with a conventional laser cavity 32 with acoustic suppressors 34 and 36 mounted on opposite sides of the laser cavity and with heat exchanger bed means 38 and 40 mounted adjacent acoustic suppressors 34 and 36 and with piston means 42 and 44 mounted adjacent heat exchangers 38 and 40 with piston means 42 and 44 being sealed relative to housing 30 in a conventional manner and with piston means 42 and 44 being coupled at coupling means 46 for unison of movement of piston means 42 and 44 back and forth in a push-pull type arrangement. Laser cavity 32 as well as all the space between piston means 42 and 44 is filled with a conventional laser gas media that is to be utilized in laser cavity 32 with a pulsed laser arrangement. Piston means 42 and 44 are sealed relative to housing 30 in a conventional manner to form a pressure seal for the laser gas media.

In operation of this device, when the laser is pulsed to cause laser action in laser cavity 32, the laser gas is heated and also caused to reverberate. To recondition this laser gas for another pulse of the laser, piston means 42 and 44 are actuated in one direction to move the gas in laser cavity 32 through an acoustic suppressor and into a heat exchanger to recondition the laser gas. After a second pulse of the laser, piston means 42 and 44 are moved in an opposite direction to recondition the laser gas with acoustic suppressor and by the heat exchanger and at the same time the previously reconditioned gas is moved back into the laser cavity. With this arrangement, the amount of volume needed for reconditioning of the laser gas as well as the power required to drive the unit is considerably reduced over a system in which the gas has to be pumped through a closed loop as illustrated in FIG. 1.

Figure 3:
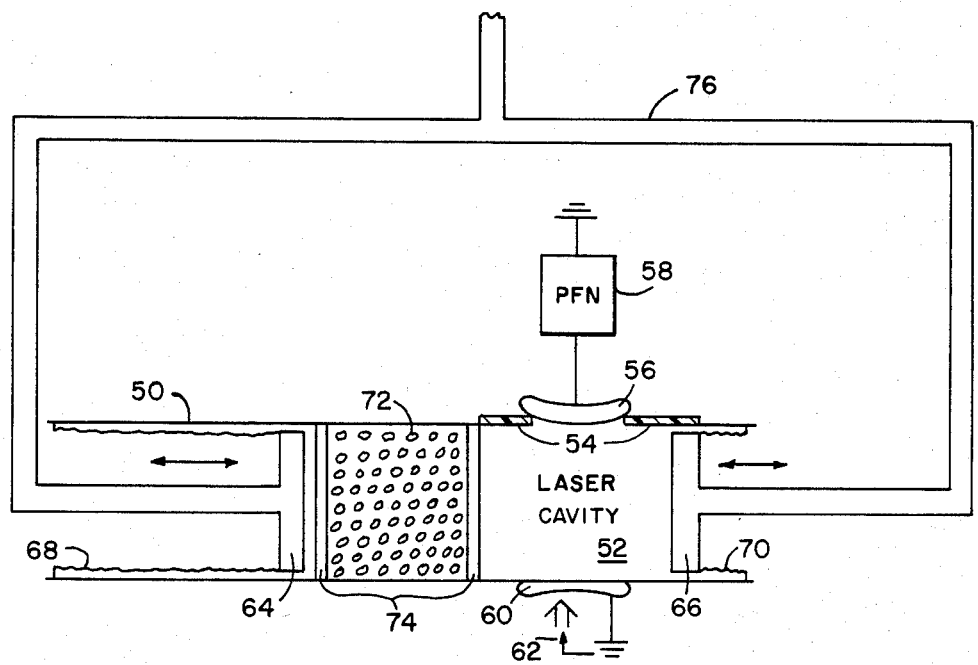
FIG. 3 is a schematic illustration of a push-pull electrically pulsed $CO_2$ laser configuration in accordance with this invention.

An even more compact embodiment of this invention is illustrated in FIG. 3. This embodiment as well as the previous embodiment can be used with an electrically pulsed $CO_2$ laser system as one example. However, the invention is equally valid for all optically pumped or electrically pumped repetitively pulsed gas laser systems excluding those in which a chemical reaction results in a change in gas species composition. That is, those in which a chemical reaction results in a change in gas species composition are not usable with this system. This system can be used with pulsed $CO_2$ systems in which the gas mixture ratios are such as 3:2:1, $He:N_2:CO_2$ or 12:1:0.24,$N_2:CO_2:H_2$ can be used. Additionally, if X-ray preionization is used for discharge stability, a high atomic number inert gas such as Xenon can be added to each laser mixture to increase the initial ionization level. X-ray preionization is preferred over UV preionization because of the lower degree of molecular disassociation produced with X-rays. This leads to more laser pulses per gas fill or equivalently to a lower gas makeup rate. An electron beam gun can also be used for discharge control; however, foil failure issues may reduce system reliability.

Referring now to FIG. 3, a push-pull electrically pulsed $CO_2$ laser is schematically illustrated and includes a housing 50 with a laser cavity 52 therein with a dielectric material 54 at one side with a cathode 56 mounted at this side and connected in a conventional manner to a pulse forming network 58. An anode 60 is mounted at an opposite side of housing 50 and X-ray preionizer 62 is connected in a conventional manner on the anode side. A pair of pistons 64 and 66 are mounted in housing 50 in a conventional manner and are sealed by conventional sealing means such as bellows seal means 68, 70. A pebble heat exchanger bed 72 is mounted on one side of cavity 52 an acoustic suppressor fine screen heat exchanger containment system 74 at opposite sides of pebbles 72 serve to contain pebbles 72 in housing 50 as illustrated. Pistons 64 and 66 are connected through connecting means 76 for movement of pistons 64 and 66 in unison. Any conventional means can be utilized for driving pistons 64 and 66 back and forth.

In operation, the complete laser system with housing 50 is initially evacuated and filled with the required laser gas media in cavity 52 as well as the other spaces between pistons 64 and 66. With a static laser gas mixture in laser cavity 52, the X-ray preionizer 62 is pulsed to produce a low level of preionization (about $10^7$ electons/$cm^3$) in the laser cavity. Pulse forming network 58 is then pulsed to produce an electrical discharge in laser cavity 52, and this creates population inversion and a subsequant laser pulse. The electric discharge in cavity 52 heats the laser gas and creates acoustic waves which distort the laser gas media. This heat must be removed and the acoustics must be damped out before the laser can be pulsed a second time. The heat and acoustic disturbances are dissipated by pebble bed 72 and containment means 74 by actuating pistons 66 and 64 to push the laser gas from cavity 52 by piston 66 through containment system 74 and pebbles 72. By expelling the heated and vibrating gas mixture from cavity 52, the laser gas is reconditioned and by moving pistons 64 and 66 in the opposite direction reestablishes the laser gas in laser cavity 52 and the device is now ready for a second laser pulse. Dielectric material 54 on the cathode side is provided to prevent arcs to the grounded structure when piston 66 is moved past cathode 56. By providing a device of this type structure as well as that of FIG. 2, a much more compact and effective system is provided for pulsed lasers of this type.

We claim:

1. In a pulsed gas laser, a housing having a laser cavity therein and a pair of piston means mounted in said housing on opposite sides of said laser cavity for movement back and forth in a push-pull arrangement, a heat exchanger and acoustic suppressor means mounted in said housing relative to said laser cavity, and laser gas media in said housing and filling said laser cavity and the space between said piston means whereby when the laser gas media in said laser cavity is pulsed to form a laser output, said laser gas is heated and produces acoustic waves that must be removed, and said pistons being mounted in said housing such that movement of said pistons in unison in one direction causes the laser gas media in said cavity that has been heated and has acoustic waves therein to be positoned into the heat exchanger and acoustic suppressor means to remove the heat from the laser gas media and to suppress the acoustic waves.

2. In a pulsed gas laser as set forth in claim 1, wherein said heat exchanger and acoustic suppressor means are mounted on each side of said laser cavity.

3. In a pulsed gas laser as set forth in claim 1, wherein said piston means have bellows seal means and said laser cavity has an X-ray preionizer and a pulse forming network connected across the laser cavity for pulsing the laser gas media and wherein a dielectric material is mounted on a cathode side of the housing to prevent arcs from the cathode when one of the pistons is moved passed the cathode structure.

4. In a pulsed gas laser as set forth in claim 3, wherein said heat exchanger is a pebble bed and said acoustic suppressor includes containment means on opposite sides of said pebble bed.

* * * * *